(12) United States Patent
Yamane et al.

(10) Patent No.: US 11,215,754 B2
(45) Date of Patent: Jan. 4, 2022

(54) OPTICAL WAVEGUIDE ELEMENT AND MANUFACTURING METHOD THEREFOR

(71) Applicant: SUMITOMO OSAKA CEMENT CO., LTD., Tokyo (JP)

(72) Inventors: Yuji Yamane, Tokyo (JP); Norikazu Miyazaki, Tokyo (JP); Yu Kataoka, Tokyo (JP); Hideki Ichimei, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 121 days.

(21) Appl. No.: 16/697,219

(22) Filed: Nov. 27, 2019

(65) Prior Publication Data

US 2020/0292752 A1   Sep. 17, 2020

(30) Foreign Application Priority Data

Mar. 13, 2019   (JP) .............................. JP2019-046138

(51) Int. Cl.
| | |
|---|---|
| *G02B 6/122* | (2006.01) |
| *G02B 6/13* | (2006.01) |
| *G02B 6/30* | (2006.01) |
| *G02B 6/293* | (2006.01) |
| *G02B 6/14* | (2006.01) |
| *G02B 6/12* | (2006.01) |

(52) U.S. Cl.
CPC .............. *G02B 6/122* (2013.01); *G02B 6/13* (2013.01); *G02B 6/14* (2013.01); *G02B 6/29361* (2013.01); *G02B 6/305* (2013.01); *G02B 2006/1204* (2013.01)

(58) Field of Classification Search
CPC ...... G02B 6/122; G02B 6/14; G02B 6/29361; G02B 6/305; G02B 6/13; G02B 2006/1204; G02B 6/1342; G02F 1/035
See application file for complete search history.

(56) References Cited

U.S. PATENT DOCUMENTS

| | | | | |
|---|---|---|---|---|
| 5,796,764 | A * | 8/1998 | Corsini | ................... H01S 3/063 372/102 |
| 2002/0154387 | A1* | 10/2002 | Mori | ................... H01S 3/06754 359/337.1 |
| 2018/0039104 | A1 | 2/2018 | Hosokawa et al. | |
| 2019/0148903 | A1* | 5/2019 | Shohda | ................. H01S 3/1611 372/40 |
| 2019/0271809 | A1* | 9/2019 | Kato | ........................ G02B 6/14 |

FOREIGN PATENT DOCUMENTS

| | | |
|---|---|---|
| JP | H0644086 | 6/1994 |
| JP | 6107868 | 4/2017 |

\* cited by examiner

*Primary Examiner* — Leslie C Pascal
(74) *Attorney, Agent, or Firm* — JCIPRNET (57) ABSTRACT

An optical waveguide element includes an optical waveguide which is formed on one surface of a substrate, an incidence part for light to be incident on the optical waveguide or an emission part for emitting light from the optical waveguide which is disposed in an end portion of the substrate, and a dielectric film which is formed on the optical waveguide of at least one of the incidence part and the emission part, and the vicinity thereof. Regarding the dielectric film, dielectric films including a dielectric film formed of a first material having an index of refraction higher than an index of refraction of the substrate and a dielectric film formed of a second material having an index of refraction lower than the index of refraction of the substrate are alternately laminated.

7 Claims, 6 Drawing Sheets

OPTICAL WAVEGUIDE ELEMENT AND MANUFACTURING METHOD THEREFOR

CROSS-REFERENCE TO RELATED APPLICATIONS

This application claims the priority benefit of Japan Application No. 2019-046138, filed on Mar. 13, 2019. The entirety of the above-mentioned patent application is hereby incorporated by reference herein and made a part of this specification.

BACKGROUND

Technical Field

The disclosure relates to an optical waveguide element and a manufacturing method therefor, and particularly relates to an optical waveguide element in which an optical waveguide is formed on one surface of a substrate, and a manufacturing method therefor.

Description of Related Art

In the fields of optical communication and optical measurement, optical waveguide elements in which an optical waveguide is formed on at least one surface of a substrate such as an optical modulator or an optical switch have been utilized. In order to respond to needs such as broadband of modulation frequencies, a plurality of optical modulation parts are being incorporated into an optical waveguide formed on one substrate as in a multi-value modulator, and a frequency of demultiplexing or multiplexing optical waves is increasing, and therefore reduction of a loss of the entire optical waveguide element is required.

Increasing the number of optical modulation parts results in not only a complicated pattern shape of an optical waveguide but also an increase in the number of control electrodes such as signal electrodes disposed in the optical modulation parts, and a wiring pattern connected to the control electrode is also complicated. Therefore, in optical waveguide elements using an X-cut electro-optical substrate, a method in which a width of a signal electrode at an intersecting part disposed on an optical waveguide is narrowed to keep a low optical loss has been proposed (refer to Patent Document 1: Japanese Patent No. 6107868).

In addition, in order to reduce the loss of the optical waveguide element, reduction of a coupling loss in a light input/output part is also required. In an optical waveguide element in which an optical waveguide is formed by thermally diffusing Ti in a lithium niobate (LN) substrate, the mode field diameter (MFD) of the optical waveguide becomes asymmetric due to titanium thermal diffusion. On the other hand, in optical coupling of an optical fiber having a symmetrical mode field diameter and an optical waveguide element, a coupling loss of approximately 0.7 dB per light incidence/emission part is generated due to mismatching of the shape of the MFD.

In order to reduce a coupling loss with respect to an optical fiber caused by asymmetry of the mode field diameter of an optical waveguide in an optical waveguide element, Patent Document 2 (Japanese Examined Patent Application H6-44086) proposes a method in which an LN film having the same material as an LN substrate is subjected to sputtering film formation on the substrate in a light input/output part of the optical waveguide. Specifically, a Ti film is vapor-deposited on a pattern of an optical waveguide of an LN substrate. Thereafter, in a part corresponding to an input/output part of the optical waveguide, an LN film is formed on the LN substrate including the Ti film by a sputtering method or the like. Thereafter, an optical waveguide is formed by thermally diffusing Ti into the LN substrate or the LN film. Consequently, asymmetry of the mode field diameter in the light input/output part is alleviated, and a coupling loss with respect to an optical fiber is reduced.

However, since the thermal diffusion rate of Ti differs between an amorphous sputtering film such as an LN film and a crystal such as an LN substrate, it is difficult to alleviate asymmetry of the mode field diameter. In addition, in Patent Document 2, a constitution in which the mode field diameter is changed gradually by forming the LN film to have a tapered thickness is proposed. However, in an LN film thicker than the range in which Ti is thermally diffused, the shape of thermal diffusion of Ti is the same. However, in a tapered part in which the thickness changes continuously, the shape of thermal diffusion of Ti varies significantly depending on the thickness of the LN film. Specifically, in a part in which the thickness of the LN film is thinner than the thermal diffusion range of Ti, Ti that has been thermally diffused to the thickness of the LN film is intensively diffused in the lateral direction perpendicular to the thickness direction. Therefore, the cross-sectional shape of the optical waveguide of the tapered part is likely to be a distorted asymmetrical shape, and the provided tapered part actually causes an increase in optical propagation loss.

SUMMARY

An aspect of the disclosure provides an optical waveguide element including an optical waveguide which is formed on one surface of a substrate, an incidence part for light to be incident into the optical waveguide or an emission part for emitting light from the optical waveguide which is disposed in an end portion of the substrate, and a dielectric film which is formed on the optical waveguide of at least one of the incidence part and the emission part, and the vicinity thereof. Regarding the dielectric film, dielectric films including a dielectric film formed of a first material having an index of refraction higher than an index of refraction of the substrate and a dielectric film formed of a second material having an index of refraction lower than the index of refraction of the substrate are alternately laminated.

According to an embodiment of the disclosure, in the optical waveguide element, when an average index of refraction of the dielectric film is n and the index of refraction of the substrate is ns, n/ns is within a range of 0.970 to 1.003.

According to an embodiment of the disclosure, in the optical waveguide element, a thickness of the dielectric film is 0.5 μm or larger.

According to an embodiment of the disclosure, in the optical waveguide element, a thickness of the substrate is 20 μm or smaller.

According to an embodiment of the disclosure, in the optical waveguide element, the substrate is jointed to a reinforcement substrate with a resin layer interposed therebetween.

According to an embodiment of the disclosure, in the optical waveguide element, the dielectric film has a part in which a film thickness is reduced gradually as the optical waveguide is separated away from the end portion.

According to an embodiment of the disclosure, in the optical waveguide element, the substrate is lithium niobate, and the dielectric film is constituted of an oxide film or a nitride film containing at least one or more elements of niobium, tantalum, silicon, titanium, zirconia, yttria, tellurium, hafnium, zinc, aluminum, magnesium, and germanium.

According to an embodiment of the disclosure, in the optical waveguide element, a coefficient of linear expansion of at least one material of the first material or the second material of the dielectric film is a value between coefficients of linear expansion of an axis a and an axis c of lithium niobate.

Another aspect of the disclosure provides a method for manufacturing an optical waveguide element in which an optical waveguide is formed on one surface of a substrate. The method includes forming a dielectric film on the optical waveguide of at least one of an incidence part for light to be incident on the optical waveguide and an emission part for emitting light from the optical waveguide, and the vicinity thereof after the optical waveguide is formed. Regarding the dielectric film, dielectric films including a dielectric film formed of a first material having an index of refraction higher than an index of refraction of the substrate and a dielectric film formed of a second material having an index of refraction lower than the index of refraction of the substrate are alternately laminated.

DESCRIPTION OF THE EMBODIMENT

The disclosure provides an optical waveguide element that alleviates asymmetry of a mode field diameter in an optical waveguide of the optical waveguide element and can reduce a coupling loss of the optical waveguide element and an optical fiber, and a manufacturing method therefor.

According to the disclosure, the optical waveguide is formed on one surface of the substrate, the incidence part for light to be incident on the optical waveguide or the emission part for emitting light from the optical waveguide is disposed in the end portion of the substrate, and the dielectric film is formed on the optical waveguide of at least one of the incidence part and the emission part, and the vicinity thereof. Regarding the dielectric film, dielectric films including a dielectric film formed of the first material having an index of refraction higher than the index of refraction of the substrate and a dielectric film formed of the second material having an index of refraction lower than the index of refraction of the substrate are alternately laminated. Therefore, asymmetry of a mode field diameter in the incidence part or the emission part can be alleviated. As a result, it is possible to reduce a coupling loss of an optical waveguide element and an optical fiber.

Hereinafter, an optical waveguide element and a manufacturing method therefor of the disclosure will be described in detail. First, as described above, the issue of the example in the related art as disclosed in Patent Document 2 is that an LN film is laminated on a lithium niobate (LN) substrate and both the LN substrate and the LN film are subjected to thermal diffusion of Ti, but an asymmetrical mode field diameter cannot be sufficiently alleviated due to their different thermal diffusion rates from each other. Furthermore, in a tapered part of an LN film, the cross-sectional shape of an optical waveguide is likely to have a distorted asymmetrical shape and particularly an optical propagation loss increases as well.

Figure 1:
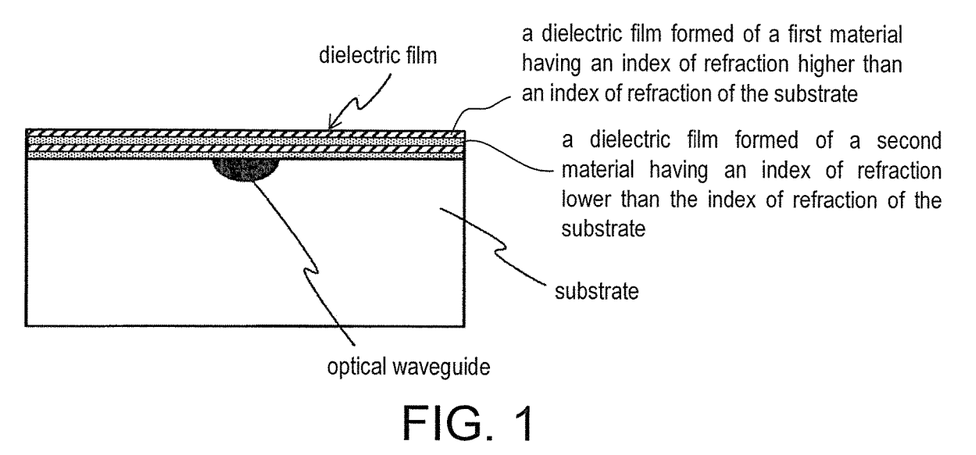
FIG. 1 is a view illustrating an example of an optical waveguide element according to the disclosure (a view of one end surface of an optical waveguide element).
Figure 2:
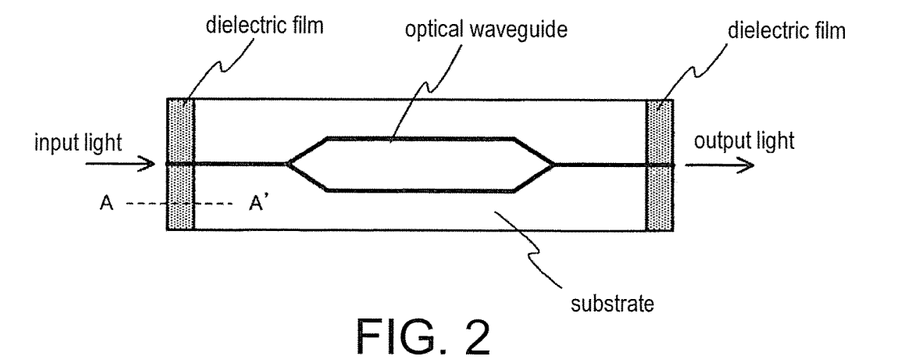
FIG. 2 is a plan view illustrating an example of the optical waveguide element according to the disclosure.
Figure 3:
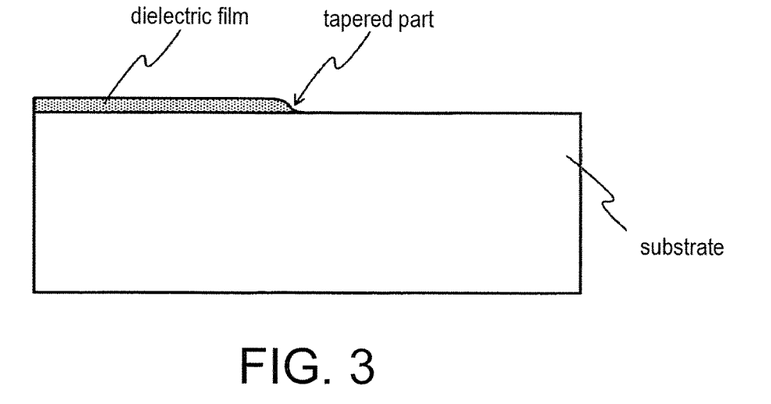
FIG. 3 is a cross-sectional view along a dotted line A-A' in FIG. 2.

In regard to this matter, as illustrated in FIGS. 1 to 3, the inventors have confirmed that asymmetry of the mode field diameter is alleviated by forming a dielectric film having an index of refraction close to that of LN (in the related art, air or an adhesive layer having a low index of refraction (n<1.6) was present) on an optical waveguide including a light input/output part, in the optical waveguide in which Ti is diffused on the LN substrate. Therefore, they have investigated a method in which an LN film is laminated on an LN substrate including an optical waveguide after thermal diffusion of Ti, that is, a process of forming an optical waveguide is performed. In addition, generally, a dielectric film disposed on an LN substrate needs to be a film having an index of refraction which is the same as that of the LN substrate or lower than that of the LN substrate, and an LN film formed of the same material as the substrate is recommended as a first candidate of a dielectric film. However, LN is a material having anisotropy, and a Ti-diffused optical waveguide in the LN substrate utilizes extraordinary light. Even if a general vapor-deposition film or a general sputtering film is formed on such an optical waveguide, it is not possible to form a film having a different index of refraction due to a polarization direction of light as in an anisotropic crystal. Accordingly, an effect of alleviating asymmetry of the mode field diameter of the optical waveguide cannot be achieved. It is effective to adopt a method of forming an epitaxial film or a method of directly bonding the same LN substrate as a method of disposing an LN film on a substrate. However, productivity deteriorates due to the high technical difficulty.

As will be described below in detail, in order to reduce a coupling loss with respect to an optical fiber, the inventors have found that a dielectric film needs to be formed to have a thickness of 0.5 μm or larger while an index n/ns of refraction obtained by normalizing an index n of refraction of the dielectric film disposed on the optical waveguide formed by thermal diffusion of Ti with the index of refraction of the LN substrate (ns=2.138) is within a range of 0.970 to 1.003 as the feature of the dielectric film.

Materials having an index of refraction lower than and close to the index of refraction of the LN substrate include tantalum oxide, silicon nitride, zinc oxide, and the like. However, as a result of calculating the normalized index n/ns of refraction which is effective in alleviating asymmetry of the mode field diameter, it has become clear that it is not possible to realize the range of 0.970 to 1.003 even if these films are formed.

Figure 4:
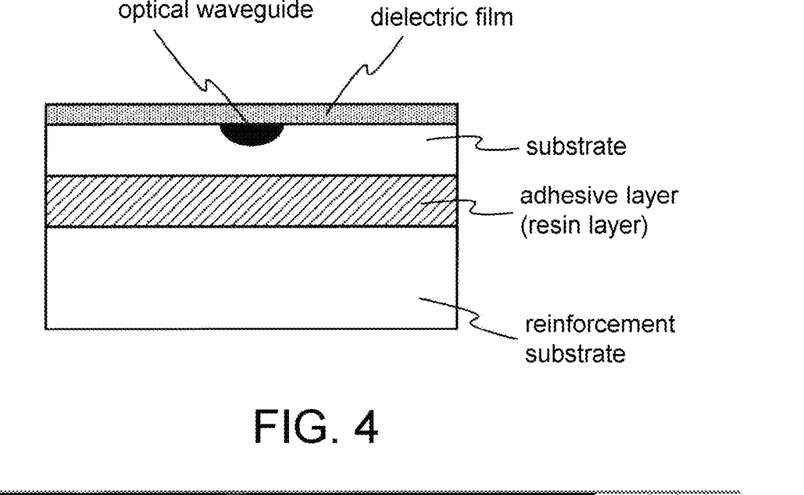
FIG. 4 is a view illustrating another example of the optical waveguide element according to the disclosure (a view of one end surface of the optical waveguide element).

In addition, it is known that the index of refraction of a silicon nitride film changes due to the nitriding rate, and therefore formation of a dielectric film having a desired normalized refractive index by reactive sputtering in which nitrogen gas is introduced has been investigated. Incidentally, as illustrated in FIG. 4, in the case of a structure in which the thickness of a substrate having an optical waveguide formed therein is 20 µm or smaller and the substrate is jointed to a reinforcement substrate with a resin layer (adhesive layer) interposed therebetween, when a dielectric film is formed, a sufficiently high temperature at the time of film formation cannot be achieved due to the presence of the resin layer. Therefore, film strength is insufficient, and an issue of film cracking or film peeling has occurred after formation.

Here, a dielectric film having a laminated structure in which a first material having a index of refraction higher than the index of refraction of the LN substrate and a second material having an index of refraction lower than the same are combined has been investigated. As a dielectric film, it is possible to utilize an oxide film or a nitride film containing at least one or more elements of niobium tantalum, silicon, titanium, zirconia, yttria, tellurium, hafnium, zinc, aluminum, magnesium, and germanium.

For example, any one of silicon, titanium oxide, and niobium oxide which are materials having an index of refraction higher than the index of substrate refraction of the LN substrate, and any one of tantalum oxide, zinc oxide, silicon oxide, magnesium oxide, and silicon nitride which are materials having an index of refraction lower than the index of substrate refraction of the LN substrate may be sputtered at the same time. In addition, a target in which both materials are mixed may be prepared and sputtered. Moreover, in a case where the influence of the composition change on the index of refraction is considered, a combination of niobium oxide and tantalum oxide having a small difference in index of refraction of both materials may be adopted. Actually, it has been confirmed that a dielectric film within a range of a desired normalized refractive index can be formed by sputtering both niobium oxide and tantalum oxide at the same time and adjusting high frequency power input to every target.

It is also possible to form a dielectric film within a range of a desired normalized refractive index by another film formation method such as chemical vapor deposition (CVD) or ion plating vapor deposition. However, when the thickness of a substrate having an optical waveguide formed therein is 20 µm or smaller and the substrate has a structure of being jointed to a reinforcement substrate with a resin layer (adhesive layer), a sputtering method using a low-temperature process in which influence on the resin layer is curbed may be adopted and a dielectric film having sufficient film strength can be formed.

Regarding the shape of a dielectric film, as illustrated in FIG. 3 (cross-sectional view along a dotted line A-A' in FIG. 2), it is preferable that a dielectric film have a part in which the film thickness is reduced gradually (a tapered part) as an optical waveguide is moved away from an end portion of the substrate. Accordingly, the mode field diameter can be changed gradually, and occurrence of an optical propagation loss can be curbed. In the case of Patent Document 2, an optical propagation loss actually increases due to the tapered part. However, in the constitution of the disclosure, improvement of characteristics of the tapered part can be expected. In the disclosure, in order to avoid an increase in optical propagation loss due to a sudden change in film thickness of a dielectric film, the angle of inclination θ of the tapered part may be 1° at the maximum or lower.

(Confirmation Test)

In order to confirm conditions of a process for manufacturing the optical waveguide element of the disclosure, the following test was performed. A commercially available lithium niobate wafer (X-cut, quality: optical grade) having a diameter of 4 inches and a thickness of 0.5 mm was used as an LN substrate.

The pattern width of a titanium film formed on the LN substrate was set to 3.0 µm, 3.5 µm, 4.0 µm, 4.5 µm, 5.0 µm, 5.5 µm, 6.0 µm, 7.0 µm, and 8.0 µm, and the height of a Ti film was set to 1,000 Å.

In order to cause titanium to be thermally diffused on the LN substrate, the temperature inside an electric furnace was set to 1,000° C., and diffusion time was 15 hours.

In order to form a dielectric film, tantalum pentoxide (purity of 4 N) and niobium pentoxide (purity of 3 N) were adopted as sputtering materials using a multi-element simultaneous magnetron sputtering apparatus. Sputtering was performed by introducing 8.2 sccm of argon and 1.0 sccm of oxygen as process gases and applying high frequency power of 320 W to the tantalum pentoxide and 500 W of niobium pentoxide.

Since a wafer that was disposed to face a target rotated inside the apparatus and a film was formed every time it passed above the target, the dielectric film was constituted of an oxide film having a laminated structure.

As illustrated in FIG. 2, in order to form the dielectric film within places limited to a light incidence part and a light emission part of an LN chip, an LN wafer surface was masked.

In addition, in order to prevent an increase in optical loss due to a sudden MFD fluctuation, the film thickness of the dielectric film in the traveling direction of the optical waveguide was gently changed (refer to the tapered part in FIG. 3).

Figure 5:
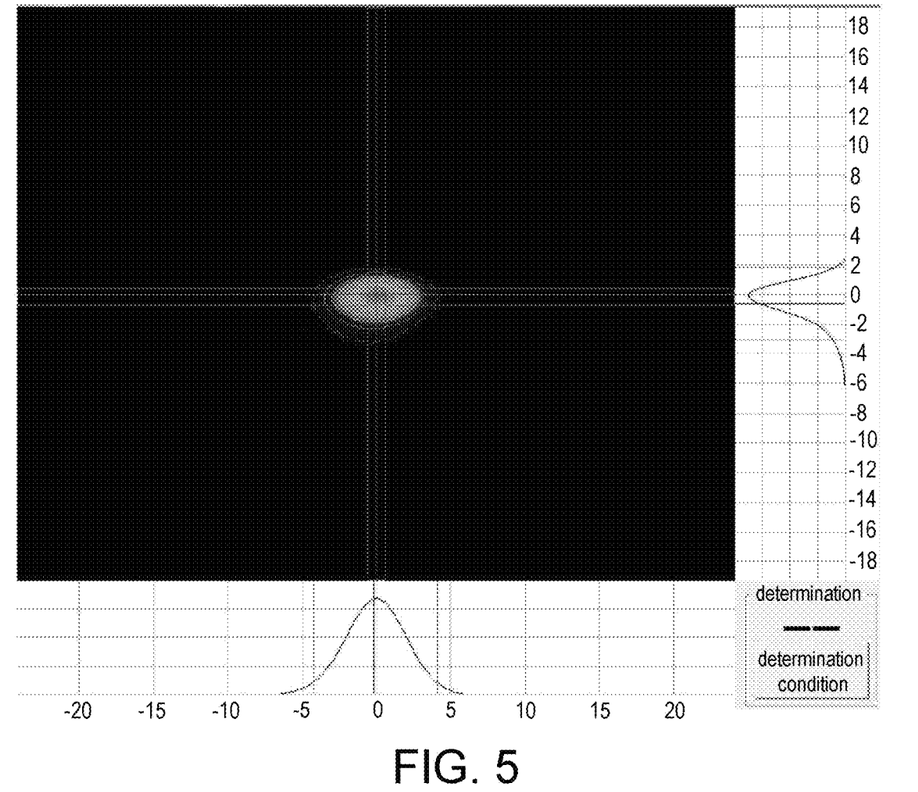
FIG. 5 is a view illustrating an MFD when no dielectric film is formed.
Figure 6:
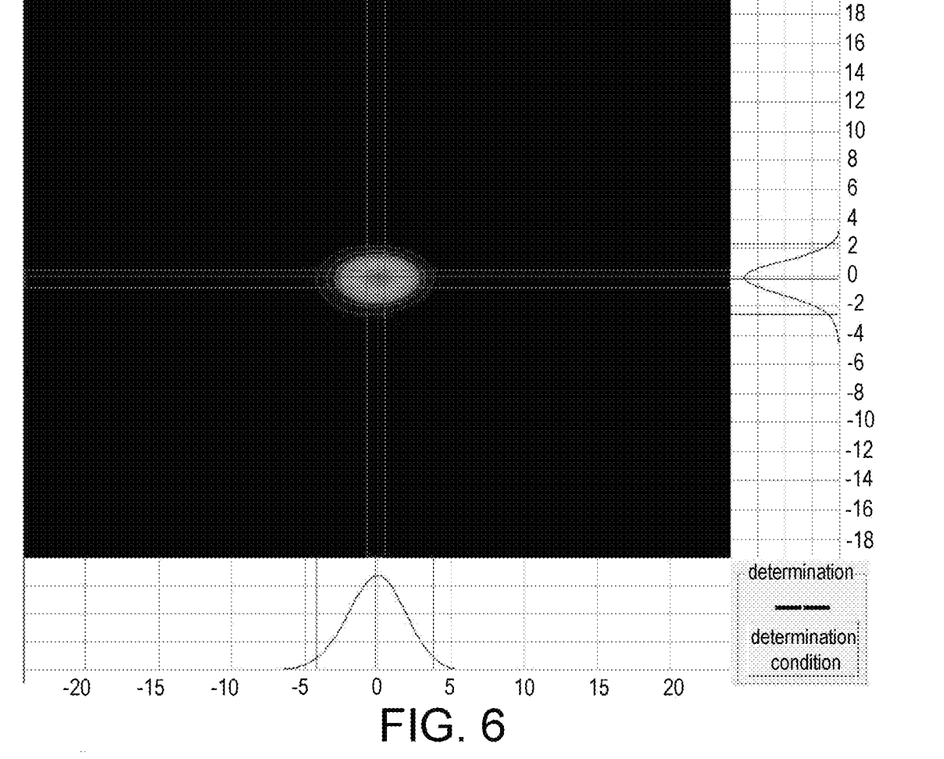
FIG. 6 is a view illustrating an MFD when a dielectric film is formed.

Over 5 µm of the pattern width of a titanium film, FIG. 5 illustrates an MFD when no dielectric film is formed, and FIG. 6 illustrates an MFD when a dielectric film is formed. Comparing FIGS. 5 and 6 to each other, it was possible to confirm that asymmetry of the mode field diameter was alleviated by providing the dielectric film on the optical waveguide formed in the LN substrate through thermal diffusion of Ti.

Regarding the pattern width of the titanium film, an automatic line width measurement system (TARCY LS200, manufactured by FLOVEL CO., LTD.) was attached to an optical microscope (MX50, manufactured by OLYMPUS CORPORATION), and the pattern width of the titanium film of the LN substrate before thermal diffusion was measured.

The pattern width after the thermal diffusion could also be measured by this system, and there was no significant difference between the pattern widths before and after the thermal diffusion.

The MFD was measured using a high-functional near field pattern (NFp) measurement optical system (M-Scope type S, manufactured by SYNERGY OPTOSYSTEMS CO., LTD.) with a wavelength of 1,550 nm.

Figure 7:
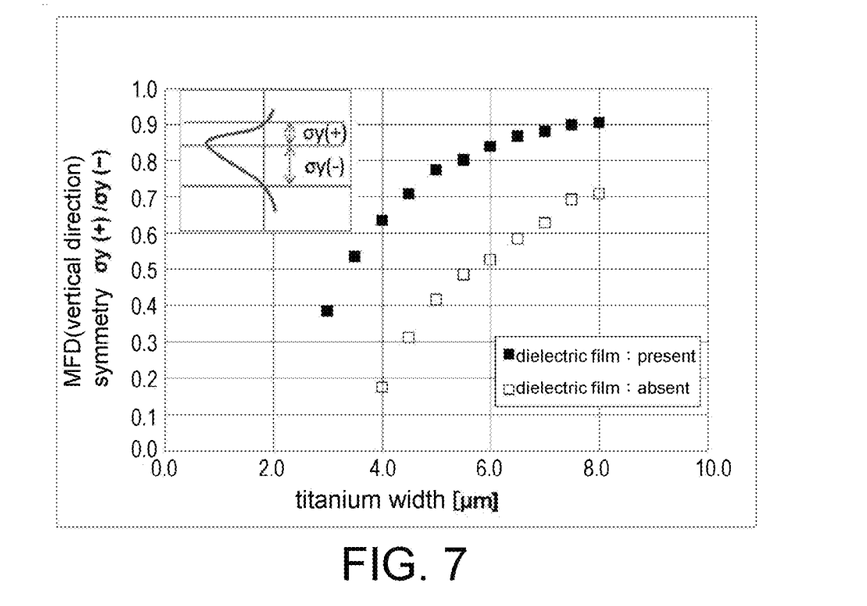
FIG. 7 is a graph showing a change in symmetry of an MFD with respect to an optical waveguide range (Ti range).

FIG. 7 shows a graph of symmetry of the MFD in the vertical direction with respect to each titanium width. Here, symmetry σy (+)/σy (−) of the MFD in the vertical direction is the mode field width (strength that becomes $1/e^2$ of the maximum value) in the upward direction (+) and the downward direction (−) in a direction (vertical direction) perpendicular to the substrate surface from the maximum value of a light intensity distribution of the MFD, and it indicates that symmetry becomes high as σy (+)/σy (−) becomes close to 1.

With reference to FIG. 7, when there was a dielectric film, compared to when there was no dielectric film, it was confirmed that symmetry σy (+)/σy (−) of the MFD in the vertical direction was close to 1 and asymmetry was alleviated. Particularly, in the optical waveguide having weak optical confinement which a titanium with is 6 μm or smaller, asymmetry was extremely improved. In addition, even when the dielectric film according to the disclosure is applied to a bent part of the optical waveguide, the effect of reducing a radiation loss is expected.

Figure 8:
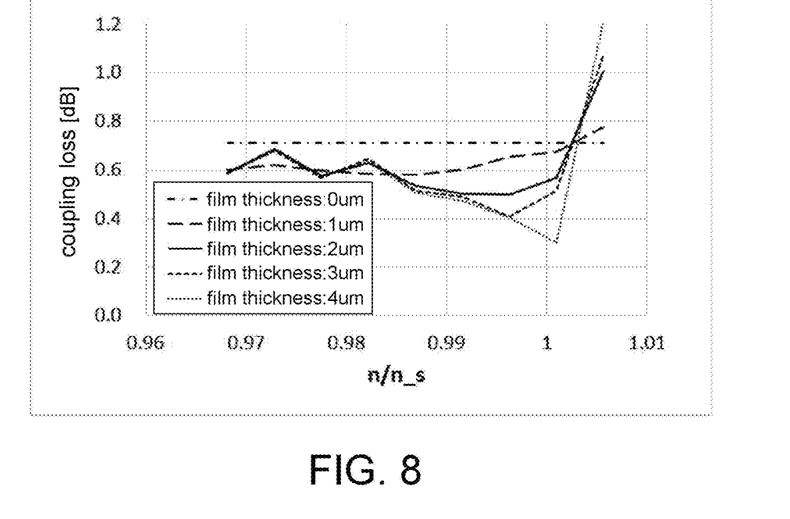
FIG. 8 is a graph showing a change in coupling loss with respect to a normalized refractive index (n/ns).

FIG. 8 shows a graph (explanatory notes in the graph denote the film thickness of the dielectric film) of calculation results of the coupling loss and dependency on the index of refraction. It is understood that the coupling loss is effectively curbed by setting the normalized refractive index of the dielectric film within a range of 0.970 to 1.003. Furthermore, regarding the film thickness of the dielectric film, improvement was seen in all cases of 1 to 4 μm. In more detailed analysis, it was confirmed that although alleviation of asymmetry of the mode field diameter was insufficient, the film thickness set to 0.5 μm or larger contributed to reduction of a coupling loss. Particularly, when the normalized refractive index is within a range of 0.981 to 1.001 and the film thickness is 1 μm or larger, a sufficient alleviation of asymmetry of mode field diameter was obtained and it leads to extreme reduction of a coupling loss. Meanwhile, it can be understood that when the normalized refractive index of the dielectric film becomes larger than the index of refraction of the substrate, the coupling loss increases, and the coupling loss is deteriorated near the normalized refractive index of 1.005 of the optical waveguide compared to when there is no dielectric film.

Figure 9:
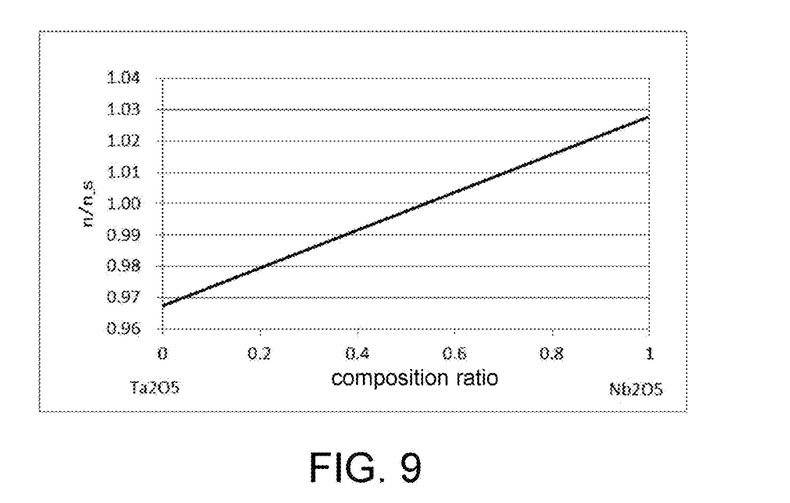
FIG. 9 is a graph showing a change in normalized refractive index with respect to a composition ratio of tantalum pentoxide and niobium pentoxide.

FIG. 9 shows a graph of a relationship of a composition ratio of the formed index of refraction and tantalum pentoxide and niobium pentoxide of the dielectric film. The horizontal axis in FIG. 9 denotes that tantalum pentoxide is 100% when the composition ratio is zero and niobium pentoxide is 100% when the composition ratio is 1. When the normalized refractive index of the dielectric film is within a range of 0.970 to 1.003, the ratio of niobium pentoxide may be within a range of 5% to 60%. When the normalized refractive index of the dielectric film is within a range of 0.981 to 1.001, the ratio of niobium pentoxide may be within a range of 20% to 60%.

Table 1 shows the indexes of refraction and the coefficients of thermal expansion of materials which are candidates of the dielectric film.

Figure 10:
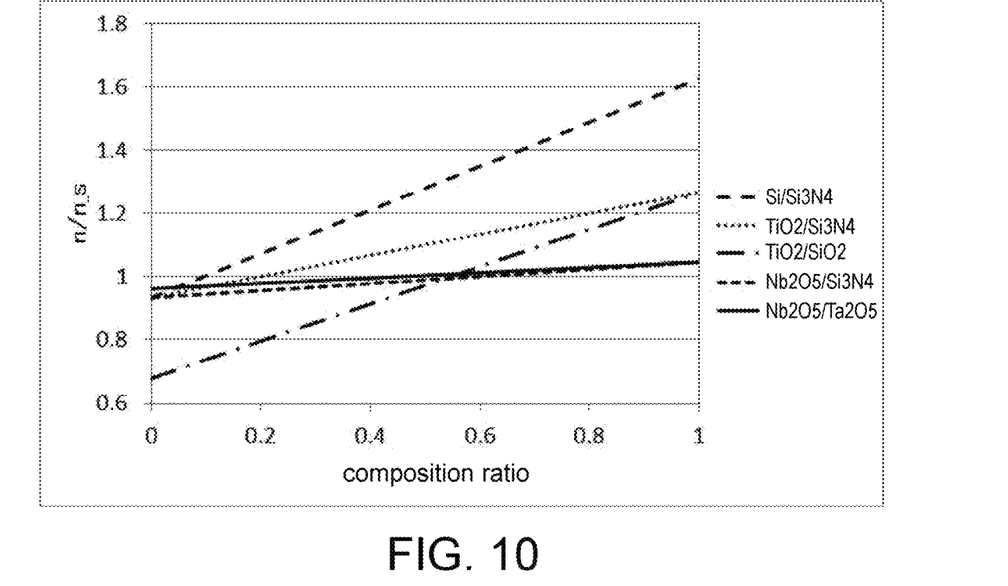
FIG. 10 is a graph showing a change in normalized refractive index with respect to the composition ratio regarding a combination of materials of two kinds.

In consideration of influence on the composition change with respect to the index of refraction, materials such as niobium oxide and tantalum oxide having a small difference between the indexes of refraction (FIG. 9) may be combined. In addition, FIG. 10 shows an example of a combination of materials of which the normalized refractive index (n/ns) of the dielectric film can be set within a range of 0.970 to 1.003, and changes in normalized refractive index depending on the composition ratio of each combination material.

TABLE 1

| Material | Index of refraction 1,550 nm | Coefficient of thermal expansion $[\times 10^{-6}/°C.]$ |
|---|---|---|
| Si | 3.48 | 3.9 |
| $TiO_2$ | 2.45 | 9.0 |
| $LiNbO_3$(no) | 2.21 | 15.0 |
| $Nb_2O_5$ | 2.20 | 14.3 |
| $LiNbO_3$(ne) | 2.14 | 7.5 |
| $ZrO_2$ | 2.11 | 4.2 |
| $TeO_2$ | 2.08 | 15.0 |
| $HfO_2$ | 2.08 | 3.8 |
| $Ta_2O5$ | 2.07 | 3.6 |
| $Si_3N_4$ | 2.04 | 3.3 |
| ZnO | 1.93 | 3.2 |
| $Al_2O_3$ | 1.75 | 5.4 |
| MgO | 1.72 | 13.5 |
| $GeO_2$ | 1.59 | 12.0 |
| $SiO_2$ | 1.44 | 0.5 |

In an LN titanium diffusion optical waveguide utilizing extraordinary light, the combination of niobium oxide having an index of refraction of 2.20 and zirconium oxide (including yttria stabilized zirconia) having an index of refraction 2.11 has the least influence of the composition fluctuation on the index of refraction. However, since zirconium oxide has high strength and high fracture toughness, a slow film formation speed through sputtering becomes an issue of the process.

Figure 11:
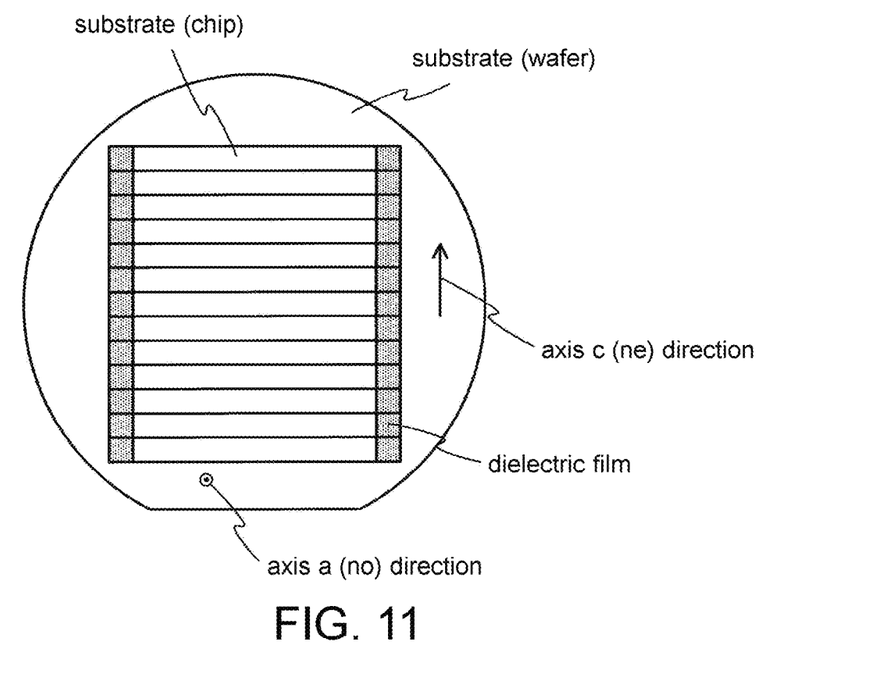
FIG. 11 is a view illustrating an example of disposing a dielectric film in a substrate wafer.

Next, with a combination of niobium oxide having an index of refraction of 2.20 and tellurium oxide having an index of refraction of 2.08, in an X-cut LN wafer, when a dielectric film is formed in the light incidence part and the light emission part (FIG. 11), it is desirable to be close to the coefficient of thermal expansion 7.5 ($\times 10^{-6}/°$ C.) in a crystal axis c (ne) direction. In addition, in consideration of the coefficient of thermal expansion 15.0 ($\times 10^{-6}/°$ C.) in a crystal axis a (no) direction (direction perpendicular to the wafer surface in FIG. 11), it is desirable that the coefficient of linear expansion of at least one material of the first material or the second material of the dielectric film be the value between the coefficients of linear expansion of the axis a and the axis c of the substrate.

Figure 12:
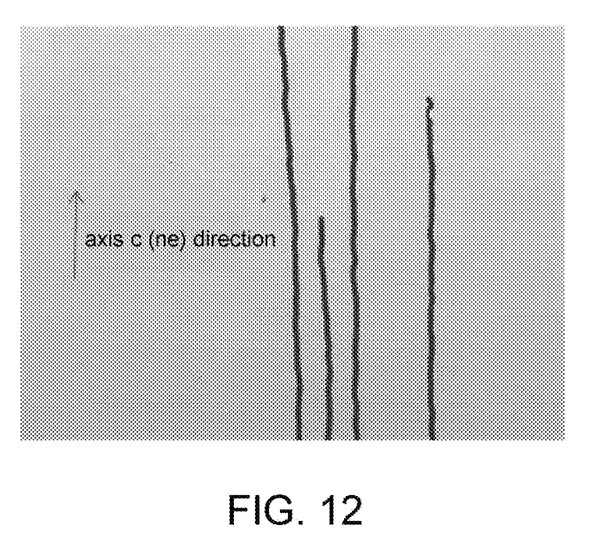
FIG. 12 is a photograph showing a cracking state of a dielectric film.

Since the coefficients of thermal expansion of niobium oxide and tellurium oxide are 14.3 and 15.0 ($\times 10^{-6}/°$ C.), respectively, they are preferable for a Z-cut LN wafer but is not so preferable for the X-cut LN wafer. In the X-cut LN wafer, when a silicon nitride film having a coefficient of thermal expansion of approximately 3.3 ($\times 10^{-6}/°$ C.) is formed, as illustrated in FIG. 12, film cracking has occurred in the axis-c direction in which the coefficient of thermal expansion differs. When an X-cut LN wafer is used, hafnium oxide, tantalum oxide, silicon nitride, or zinc oxide having a small difference in index of refraction with respect to niobium oxide may be combined to realize controlling of the index of refraction and the consistency of the coefficient of thermal expansion. Particularly, when film formation is performed with respect to a structure in which the thickness of the X-cut LN substrate in which the optical waveguide is formed is 20 μm or smaller and the substrate is jointed to the reinforcement substrate with the resin layer of interposed therebetween, tantalum oxide having high stability of film quality may be combined with niobium oxide having weak film stress.

In the foregoing description, lithium niobate (LN) has been mainly described as a substrate material. However, in addition thereto, a crystal material such as lithium tantalate or lanthanum zirconate titanate (PLZT), or a semiconductor substrate such as InP can be used. In addition, as a method of forming an optical waveguide, needless to say, the disclosure can be applied not only to a method of thermally diffusing a substance having a high index of refraction such as titanium (Ti) on a lithium niobate substrate (LN substrate) but also to a case of being formed by a proton exchange method or the like.

As described above, according to the disclosure, it is possible to provide an optical waveguide element that alleviates asymmetry of a mode field diameter in an optical waveguide of the optical waveguide element and can reduce a coupling loss of the optical waveguide element and an optical fiber, and a manufacturing method therefor.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical waveguide element, comprising:
   an optical waveguide which is formed on one surface of a substrate;
   an incidence part for light to be incident into the optical waveguide or an emission part for emitting light from the optical waveguide which is disposed in an end portion of the substrate; and
   a dielectric film which is formed on the optical waveguide of at least one of the incidence part and the emission part, and the vicinity thereof,
   wherein in the dielectric film, dielectric films including a dielectric film formed of a first material having an index of refraction higher than an index of refraction of the substrate and a dielectric film formed of a second material having an index of refraction lower than the index of refraction of the substrate are alternately laminated,
   wherein the substrate is lithium niobate, and the dielectric film is constituted of an oxide film or a nitride film containing at least one or more elements of niobium, tantalum, silicon, titanium, zirconia, yttria, tellurium, hafnium, zinc, aluminum, magnesium, and germanium, and
   a coefficient of linear expansion of at least one material of the first material or the second material of the dielectric film is a value between coefficients of linear expansion of an axis a and an axis c of lithium niobate.

2. The optical waveguide element according to claim 1, wherein an average index of refraction of the dielectric film is n and the index of refraction of the substrate is ns, n/ns is within a range of 0.970 to 1.003.

3. The optical waveguide element according to claim 1, wherein a thickness of the dielectric film is 0.5 μm or larger.

4. The optical waveguide element according to claim 1, wherein a thickness of the substrate is 20 μm or smaller.

5. The optical waveguide element according to claim 4, wherein the substrate is jointed to a reinforcement substrate with a resin layer interposed therebetween.

6. The optical waveguide element according to claim 1, wherein the dielectric film has a part in which a film thickness is reduced gradually as the optical waveguide is moved away from the end portion.

7. A method for manufacturing an optical waveguide element in which an optical waveguide is formed on one surface of a substrate, the method comprising:
   forming a dielectric film on the optical waveguide of at least one of an incidence part for light to be incident into the optical waveguide or an emission part for emitting light from the optical waveguide, and the vicinity thereof after the optical waveguide is formed,
   wherein in the dielectric film, dielectric films including a dielectric film formed of a first material having an index of refraction higher than an index of refraction of the substrate and a dielectric film formed of a second material having an index of refraction lower than the index of refraction of the substrate are alternately laminated,
   wherein the substrate is lithium niobate, and the dielectric film is constituted of an oxide film or a nitride film containing at least one or more elements of niobium, tantalum, silicon, titanium, zirconia, yttria, tellurium, hafnium, zinc, aluminum, magnesium, and germanium, and
   a coefficient of linear expansion of at least one material of the first material or the second material of the dielectric film is a value between coefficients of linear expansion of an axis a and an axis c of lithium niobate.

* * * * *